Aug. 21, 1956
A. DIERKSEN
2,759,314
CULTIVATOR
Filed June 28, 1954
2 Sheets-Sheet 1
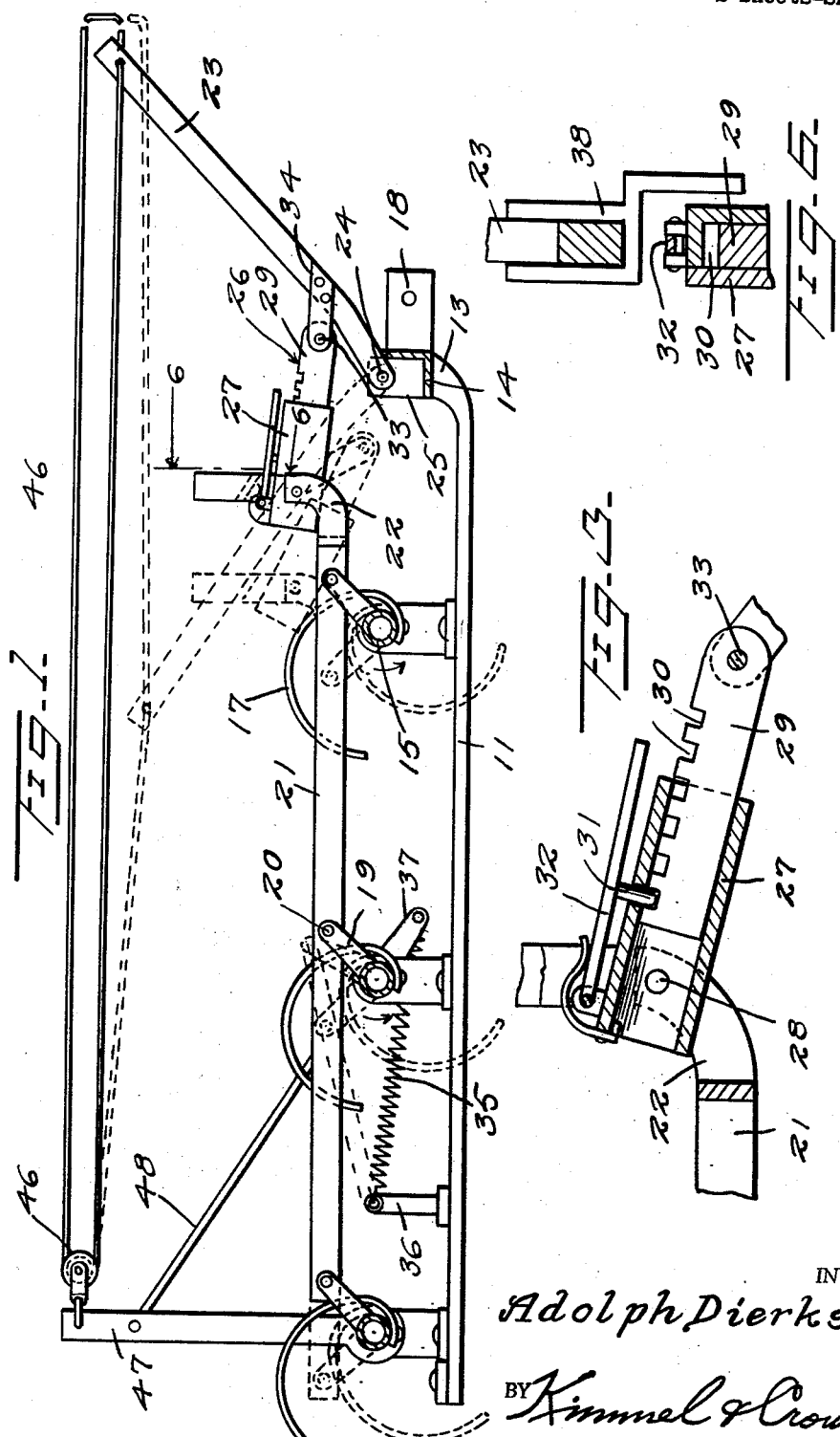
INVENTOR
Adolph Dierksen
BY Kimmel & Crowell
ATTORNEYS Aug. 21, 1956
A. DIERKSEN
2,759,314
CULTIVATOR
Filed June 28, 1954
2 Sheets-Sheet 2
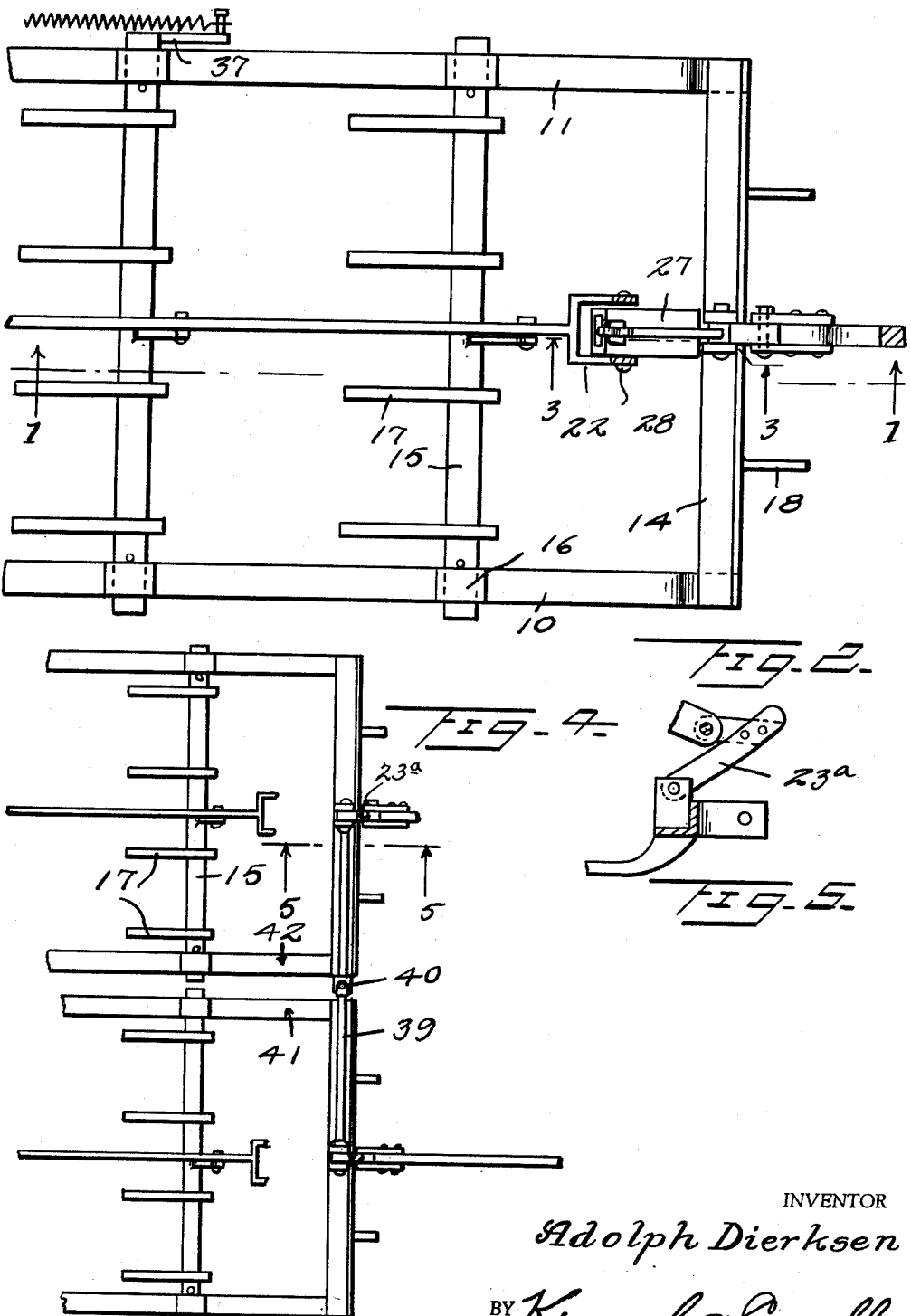
INVENTOR
Adolph Dierksen
BY Kimmel & Crowell
ATTORNEYS United States Patent Office 2,759,314
Patented Aug. 21, 1956

2,759,314
CULTIVATOR
Adolph Dierksen, Enid, Okla.
Application June 28, 1954, Serial No. 439,591
4 Claims. (Cl. 55—104)

This invention relates to cultivators and more particularly to the retractable spring tooth type.

An object of this invention is to provide in a cultivator an improved means for moving the teeth to operative or inoperative position.

Another object of this invention is to provide a tooth adjusting means which will automatically lock in operative position.

A further object of this invention is to provide a tooth adjusting means which will permit coupling two or more cultivators together for adjustment from a single lever.

A further object of this invention is to provide in a tooth adjusting means for a cultivator a spring adapted to urge the adjusting means to operative or inoperative position.

With the above and other objects in view, my invention consists in the arrangement, combination and details of construction disclosed in the drawings and specification, and then more particularly pointed out in the appended claims.

In the drawings:

Figure 1 is a sectional view taken on the line 1—1 of Figure 2, showing a cultivator or harrow constructed according to an embodiment of this invention.

Figure 2 is a fragmentary plan view of the device.

Figure 3 is a fragmentary sectional view taken on the line 3—3 of Figure 2.

Figure 4 is a fragmentary plan view showing the manner in which a series of cultivators or harrows may be coupled together.

Figure 5 is a fragmentary sectional view taken on the line 5—5 of Figure 4.

Figure 6 is a fragmentary sectional view taken on the line 6—6 of Figure 1.

Referring to the drawings, the numerals 10 and 11 designate generally a pair of longitudinal frame bars which are formed with upturned forward ends 13. The longitudinal bars 10 and 11 are connected together at their forward ends by an angle-shaped connecting bar 14.

A plurality of transverse tubular shafts 15 are mounted in bearings 16 carried by the bars 10 and 11, and the shafts 15 have fixed thereon a plurality of spring teeth 17.

The front bar 14 has fixed thereto and projecting forwardly therefrom a pair of lugs 18 which provide a means whereby a drawbar or hitch means may be connected to the cultivator or harrow.

Each shaft 15 has fixed thereto an arm 19 which is pivotally connected as at 20 to a longitudinal shaft operating bar 21. The bar 21 is formed with an upturned forward end 22 which is preferably in the form of a fork, as shown in Figure 2.

A tooth adjusting lever 23 is mounted on a pivot 24 extending between a pair of lugs 25 fixed to the inside of the angle bar 14.

A linkage, generally indicated at 26, is connected between lever 23 and the upturned end 22. This linkage 26 includes a keeper housing 27 which is pivotally secured as at 28 to the upturned end 22 of bar 21. The linkage 26 also includes a slide bar 29 which is slidable within the housing 27 and is formed with a series of spaced keeper notches 30.

A lock bolt or pin 31 carried by spring-pressed lever 32 is adapted to engage in a selected one of the notches 30. The forward end of link member or slide 29 is pivotally connected as at 33 to an obliquely inclined arm 34 which is fixed to and projects rearwardly from lever 23.

The shafts 15 are normally held in either an operative or inoperative position with respect to the teeth 17 by means of a spring 35 which is connected at one end to a fixed member 36 carried by a runner or longitudinal bar 11. The other or forward end of spring 35 is connected to an arm or lever 37 which is fixed to an intermediate shaft 15 preferably at one end of this shaft.

In other words when the teeth 17 are out of the ground the end of lever 37 will be below the center of shaft 15 and will hold the teeth in their upper inoperative position, whereas turning of shaft 15 counterclockwise will raise lever so that spring 35 will be above the center of shaft 15 to yieldingly hold the teeth 17 in lower operative position.

In the operative position of the teeth, which is shown in dotted lines in Figure 1, lever or arm 37 will be in an upraised position, and in the inoperative or full line position of the teeth 17, lever 37 will be disposed in the downwardly and forwardly inclined position below the axis of shaft 15.

When lever 23 is swung upwardly and rearwardly to the dotted line position shown in Figure 1, whereby the bar 21 will be moved rearwardly and teeth 17 will be swung downwardly to operative position, lever 23 will engage in a cradle 38 which is fixed to and projects upwardly from the forward end 22 of bar 21.

At this time pivot member 33 will be disposed below the plane of a line extending through the center pivot 24 and pivot 28 so that the forward pressure exerted by the teeth 17 on bar 21 will maintain lever 23 in a locked operative position. Lever 23 is swung forwardly to move teeth 17 to an inoperative position, and at this time spring 35 will assist in the forward movement of bar 21 and the forward swinging of lever 23.

Where two or more of these cultivators are to be coupled together this can be accomplished by providing the pivot member 24 in the form of a shaft 39 having a universal joint 40 disposed between a pair of the cultivators generally indicated at 41 and 42.

As shown in Figure 5, where shaft 39 is used for operating an adjacent cultivator, lever 23 is shortened as indicated at 23a. In other respects the structure shown in Figures 1, 2, and 3 will be identical with respect to the adjacent cultivators.

The operating lever 23 may be remotely operated to released or operative position by means of an endless cable 45 which is secured to lever 23 and trained through a sheave 46 which is carried by an upright bar 47. Bar 47 extends upwardly from the rear shaft 15 and is braced by means of a brace 48. Cable 45 is extended to the tractor, and pull on the upper run of cable 45 will swing lever 23 rearwardly to operative position wherein the teeth 17 are in lower plowing position. Pull on the lower run of cable 45 forwardly of lever 23 will swing lever 23 forwardly to raise teeth 17 to inoperative position.

What is claimed is:

1. In a cultivator having a frame, a plurality of transverse shafts carried by said frame and spring teeth on said shafts, an elongated bar overlying said shafts, an arm fixed to each shaft, means pivotally connecting said arms to said bar, an adjusting lever pivotally carried by the front of said frame, a rearwardly projecting arm fixed to said lever, a link means pivotally connecting one end of said link with the said rearwardly projecting arm and means pivotally connecting the other end of said link with the forward end of said bar, said adjusting lever having a forward position in which the spring teeth are withdrawn from engagement with the ground and a rearward position in which the spring teeth have maximum penetration in the ground, the pivot connection of said link with said rearwardly projecting arm being below the plane extending through the axes of the pivotal connection of the lever with the frame and the pivotal connection between the link and the bar when the lever is in its rearward position and above the plane extending through said last-named pivotal connections when the lever is in its forward position.

2. The construction set forth in claim 1 wherein said linkage includes a pair of lengthwise adjustable members.

3. The construction set forth in claim 1 including spring means holding said teeth in operative or inoperative position.

4. The construction set forth in claim 1 wherein said linkage includes an elongated housing pivotally secured to the forward end of said bar, a notched bar slidable in said housing and pivotally secured at its forward end to said latter named arm, and a spring-pressed locking member pivotally engaging a selected notch to lock said notched bar in endwise adjusted position relative to said housing.

References Cited in the file of this patent

UNITED STATES PATENTS

| | | |
|---|---|---|
| 181,995 | Stokesbary | Sept. 5, 1876 |
| 1,384,790 | Warne | July 19, 1921 |
| 1,626,793 | DeRosa | May 3, 1927 |